(No Model.) 3 Sheets—Sheet 1.
F. D. T. LEHMANN.
FIREPROOF CONSTRUCTION.
No. 585,111. Patented June 22, 1897.
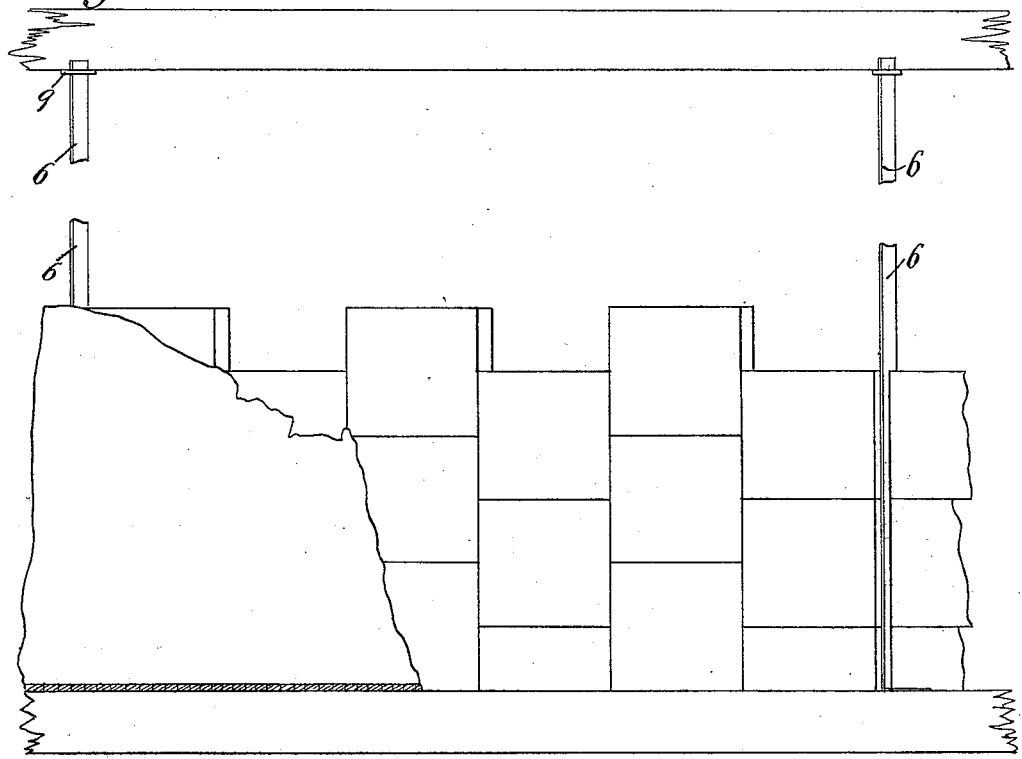
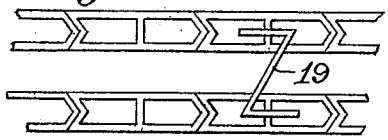
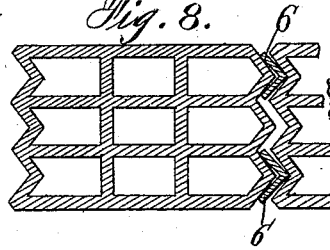
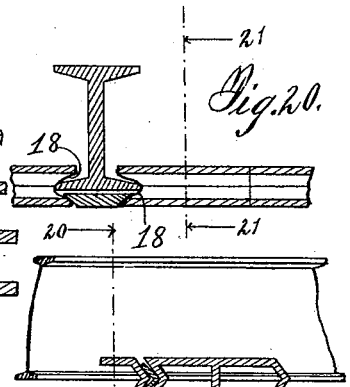
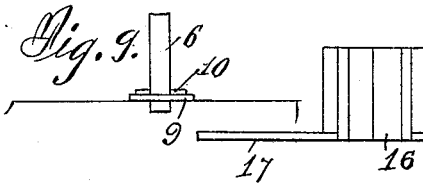
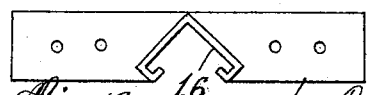
Witnesses: Inventor
Friedrich D. T. Lehmann
by Rudolph —
Atty.

(No Model.) 3 Sheets—Sheet 2.
F. D. T. LEHMANN.
FIREPROOF CONSTRUCTION.
No. 585,111. Patented June 22, 1897.
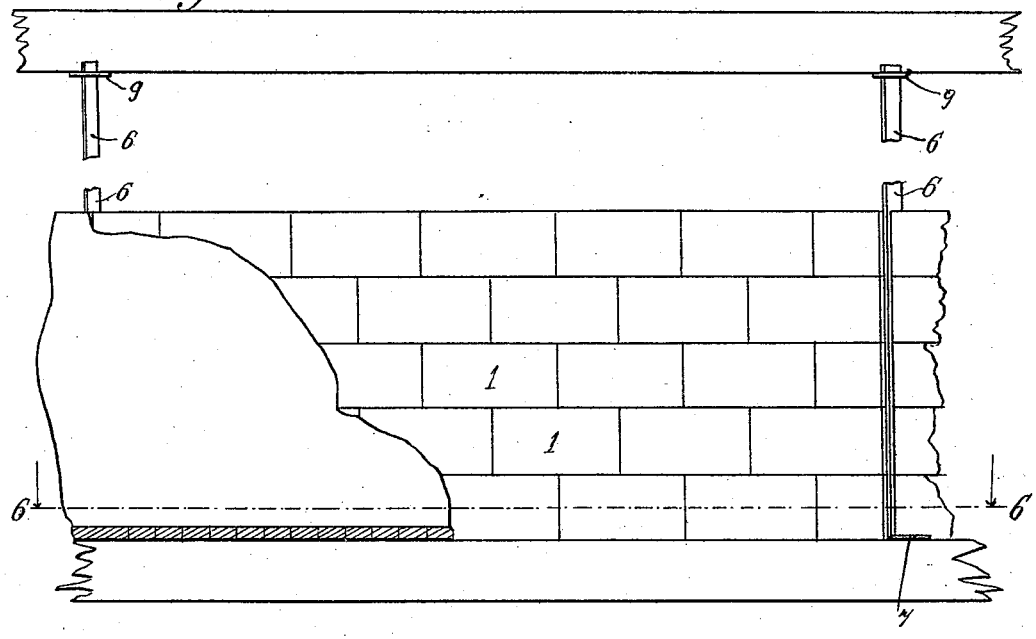
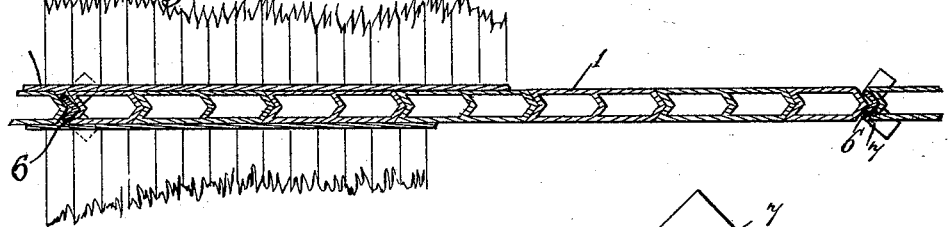
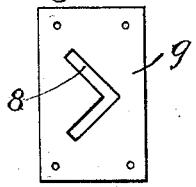
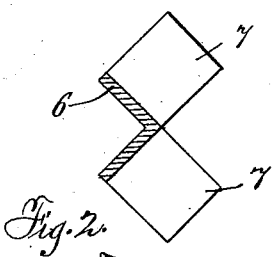
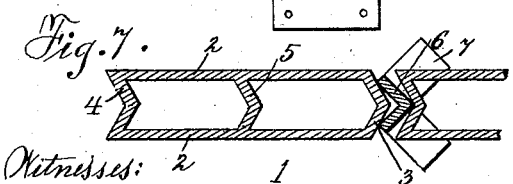
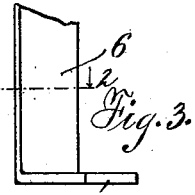
Witnesses: Inventor
Friedrich D. T. Lehmann
by Rudolph Wm. Lotz atty.
THE NORRIS PETERS CO., PHOTO-LITHO., WASHINGTON, D. C.

(No Model.) 3 Sheets—Sheet 3.
F. D. T. LEHMANN.
FIREPROOF CONSTRUCTION.
No. 585,111. Patented June 22, 1897.
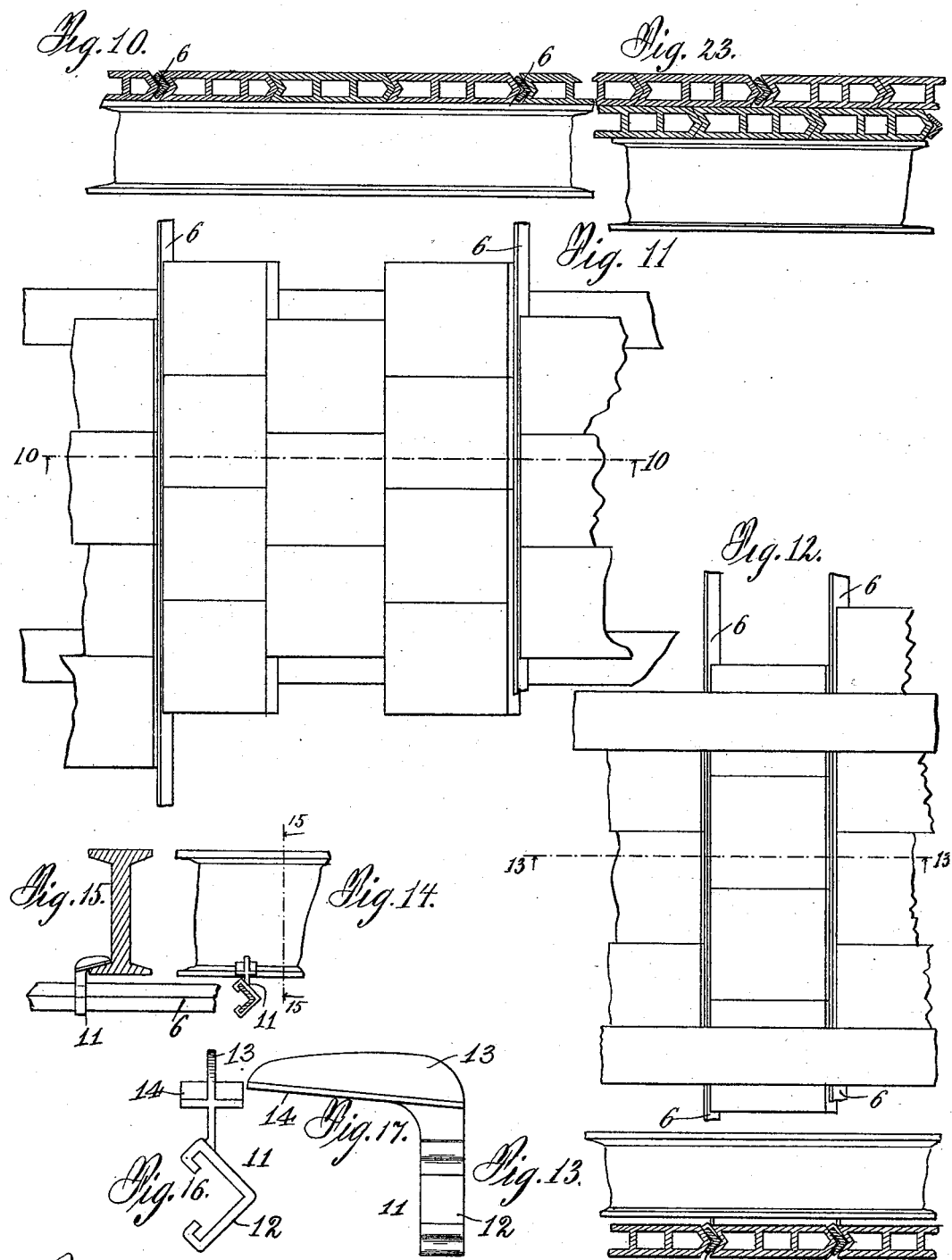

UNITED STATES PATENT OFFICE.

FRIEDRICH D. T. LEHMANN, OF CHICAGO, ILLINOIS, ASSIGNOR TO
F. LEHMANN & CO., OF SAME PLACE.

FIREPROOF CONSTRUCTION.

SPECIFICATION forming part of Letters Patent No. 585,111, dated June 22, 1897.

Application filed October 17, 1896. Serial No. 609,190. (No model.)

*To all whom it may concern:*

Be it known that I, FRIEDRICH D. T. LEHMANN, a citizen of the United States, residing at Chicago, in the county of Cook and State of Illinois, have invented certain new and useful Improvements in Fireproof Constructions; and I do hereby declare the following to be a full, clear, and exact description of the invention, such as will enable others skilled in the art to which it appertains to make and use the same.

My invention relates to a novel fireproof construction, the object being to provide a strong, durable, and efficient construction of this character which will permit of easy and quick setting and will permit of lighter and cheaper construction than has heretofore been possible.

My invention consists in the features of construction and combinations of parts hereinafter fully described and claimed.

In the accompanying drawings, illustrating my invention, Figure 1 is a side elevation of a wall or partition constructed in accordance with my invention. Fig. 2 is a transverse section of the angle-irons I employ, taken on the line 2 2 of Fig. 3. Fig. 3 is a side elevation of the same. Fig. 4 is a view in elevation of a plate adapted to receive the end portions of the angle-irons. Fig. 5 is a side elevation of a wall or partition, showing another manner of building same. Fig. 6 is a sectional view of same on the line 6 6 of Fig. 5. Fig. 7 is a similar section on an enlarged scale. Fig. 8 is a detail sectional view showing the manner of building a wall or partition of greater thickness. Fig. 9 is a detail view in elevation, showing another manner of setting the angle-irons. Fig. 10 is a sectional view of a floor constructed in accordance with my invention, taken on the line 10 10 of Fig. 11. Fig. 11 is a plan view of same. Fig. 12 is a top plan view of a ceiling constructed in accordance with my invention. Fig. 13 is a sectional view of same on the line 13 13 of Fig. 12. Fig. 14 is a detail view in elevation, showing the manner of hanging the angle-irons. Fig. 15 is a sectional view on the line 15 15 of Fig. 14. Figs. 16 and 17 are detail views in elevation of the hangers I employ in connection with my ceiling. Figs. 18 and 19 are views in elevation of another form of support for the angle-irons employed in walls and partitions. Figs. 20 and 21 are detail sectional views of a modified construction of my ceiling. Fig. 22 is a horizontal section of a wall or partition provided with a large airspace. Fig. 23 is a sectional view showing my construction as applied to a roof.

My invention consists, mainly, in providing a fireproof construction in which angle-irons are employed in combination with tiles, which are so formed that they interlock with said angle-irons and with each other in such a manner as to make a wall, partition, floor, or ceiling built of the same practically indestructible. To this end I employ a hollow tile 1, having parallel side walls 2, a front end wall 3, rear end wall 4, and one or more middle walls 5, the three last named being also preferably parallel with each other, though said middle walls 5 may vary in this particular. Said front wall 3 projects beyond the ends of the side walls 2 and comes to a point midway between the same, the two portions thereof extending at an angle greater than ninety degrees to each other. Said rear wall 4, being parallel with said front wall 3, obviously forms a recess in the rear end of the tile in which the projecting front wall or "nose" of another tile is adapted to fit. Said middle wall or walls 5 may either be parallel with said front and rear walls 3 and 4, as shown in Figs. 6 and 7, or they may extend transversely between said side walls 2, as shown in Figs. 8, 10, and 13. For walls of greater thickness said tiles are adapted to be duplicated, triplicated, or increased still more in width, as shown in Fig. 8, according to the desired thickness of the wall, and in this case are provided with a plurality of projections and recesses of the same size as the projection or nose and recess of the tile above described.

In the construction of walls or partitions the angle-irons 6 are set upright at regular intervals in such a manner that a line drawn through the meeting edges of the flanges thereof will divide the angles formed thereby into two equal parts. Said angle-irons 6 are preferably cut at their lower end portions at the meeting edges of the flanges and the divided ends 7 of said flanges bent outwardly, as shown in Figs. 2 and 3, to form a base upon which said angle-irons stand. At their upper ends said angle-irons are adapted to enter slots 8 in plates 9, which are adapted to be secured to the ceiling-joists.

When tiles of greater width, such as shown in Fig. 8, are employed, I prefer to employ a plurality of angle-irons, and in this case I prefer to set their lower ends in slotted plates having a plurality of slots 8 and to secure them therein by means of pins 10, passing through openings through the meeting edges of the flanges thereof, which are adapted to engage the upper faces of said plates. Said angle-irons are adapted to receive the projecting front walls or noses of said tiles and to enter the recesses in the rear walls of the tiles on the other side thereof, whereby they will obviously interlock with said tiles and form a very solid wall. The construction shown in Fig. 1 is particularly strong and durable. In this construction I begin by setting a tile of half the regular height on the floor or foundation and a tile of regular height on top of same, the noses thereof entering the recess in the angle-iron. A tile of regular height is then set so that its nose enters the recesses in both of the tiles first set, whereby it would obviously hold the rear ends of said tiles in alinement with each other. Behind said tile I set another of half the regular height, and so on until I have reached the point at which the next angle-iron is to be set. I then continue to build upwardly with tiles of regular height until the required height is reached and then fill in the recesses at the upper end with half-tiles. In this manner it will be seen that every tile of regular height will engage and be engaged at each end by two other tiles with which it interlocks, so as to form a practically indestructible wall or partition. After this section has been set another angle-iron is set in place and enters the recesses of all of the last column of tiles, and thus binds them into vertical alinement. This procedure may obviously be varied as may be found most practical. The tiles used in this construction may obviously have the transverse middle walls shown in Figs. 8, 10, and 13.

In Figs. 5, 6, and 7 I have shown another construction which I consider inferior to the above, but which may be more practical in some instances and which would at all events be stronger and more durable than any construction now in use. In this construction I do not vary the height of the tiles, but break them adjacent the middle wall, which must coincide in shape with the front and rear walls, so as to form tiles of half the regular length. I then proceed, as in bricklaying, by setting each tile so as to lie partially upon two of the next lowest tiles.

It will be obvious that in building walls or partitions of greater thickness it is advantageous that the thickness of the tile be increased instead of setting several tiles side by side. For such walls or partitions I therefore make the tiles as shown in Fig. 8, which amounts practically to the same thing as setting a plurality of narrow tiles side by side and cementing their side walls together, but it will obviously make a stronger, lighter, and cheaper wall. In this construction I prefer to employ a plurality of angle-irons, though it is obvious that it is not necessary to make the number coincide with the number of so-called "noses" on the tile in order to obtain the requisite strength. A smaller number will suffice.

I desire also to call attention to the fact that by making the angles of the noses and recesses of the tiles greater than ninety degrees, and consequently greater than the angles of the angle-irons, I provide air-spaces around said angle-irons, and thus partially insulate them to a greater extent than would otherwise be possible without detracting from the strength of the wall. This partial insulation is obviously very advantageous, as it prevents the angle-irons from heating in case of fire as quickly as they otherwise would, which increases the life of the wall to a great extent.

The manner of setting my angle-irons in the slotted plates 9 is also of inestimable value, as it permits the ready expansion and contraction of the same under variations of temperature. It is obvious that if this is not provided for said angle-irons would be forced to bend under an unusually high temperature, and as such bend would be toward either side of the wall, the least resistance being offered there, it would probably cause a premature falling of such wall. As no so-called "fireproof" construction is absolutely fireproof, but serves only to prevent the rapid spread of fire, it will be obvious that every minute of increase of the life of a wall or partition is very valuable.

Heretofore it has been customary to lay the tile floor and ceiling of a fireproof building between the steel I-beams in flat arches. This construction is very disadvantageous, inasmuch as it subjects the flanges of the beams directly to the heat, as they are protected only by a thin layer of plaster below and a floor either of wood or thin tile or mosaic above. The air-spaces between said beams are also limited and each section of the same shut off from communication with the adjacent section. This makes such construction very short lived and of very little protective value. It is also expensive, inasmuch as almost every tile of every section must have a different shape and it requires skilled workmen to set these tiles properly.

By the use of my tile I am enabled to overcome all of the above disadvantages and to provide a very long-lived construction under the severest tests.

The I-beams of a building are usually set so to form squares of greater or less extent, according to the required strength. In laying the floor shown in Figs. 10 and 11 I lay an angle-iron across the beams in one direction and against the wall or other rigid portion in such a manner that it projects therefrom and then place tiles against the same, so that said angle-iron will enter the recesses in the rear walls thereof. The first tiles laid lie so that their middle portions lie upon the flanges of the beams running crosswise of said angle-irons. Owing to the fact that the thickness of said tiles is greater than the greatest width of said angle-irons the same will be supported by said tiles and be held out of contact with the beams. Said row of tiles is then completed and the next row laid, so that each tile thereof will engage adjacent halves of two tiles in the first row. Another row is then laid to coincide in position with the first row, and an angle-iron or a plurality of angle-irons, according to the length of the row, is then laid to engage the noses of said last-named row. This procedure is continued until the floor is completed, temporary supports for said tiles being employed until the floor is complete or until several sections are complete, when they may be removed. In this manner it will be obvious that I make a floor which is perfectly solid and is supported entirely by the tiles lying upon the upper faces of the beams, but of which the several sections are firmly locked by the angle-irons supported thereby and by the interfitting noses and recesses thereof.

The ceiling shown in Figs. 12, 13, 14, and 15 is constructed by hanging the angle-irons from the beams at regular intervals by means of metal hangers 11, which are provided with a portion 12, coinciding in form with the angle-irons and adapted to receive the same. Said portion 12 is secured at its upper portion to an overhanging rib or projection 13, provided along its lower edge with flanges 14, adapted to rest upon one of the lower flanges of the I-beams. In this construction an angle-iron is provided between each row of tiles, which are temporarily supported while being hung until a sufficient number of rows have been completed to so wedge the angle-irons between the tiles as to prevent them from swinging out of place and so drop the tiles. In this manner I provide a protecting-layer of tiles above and below the beams and leave an air-space between said layers of tiles greater in depth than the depth of said beams and thus establish communication between the several sections of air-space between said beams. I also provide air-spaces above and below said beams, owing to the fact that I employ hollow tiles.

In Figs. 18 and 19 I have shown a modified construction of a holder adapted to be substituted for said plates 9, and which comprises a portion 16, coinciding in shape with said portion 12 of said hanger, and is provided with outwardly-extending flanges 17, by means of which it is adapted to be secured to the beams or joists.

In Figs. 20 and 21 I have shown another manner of constructing a ceiling in which the hangers are not used. In this construction I cut grooves 18 into the ends of the first row of tiles, which are adapted to receive the edges of the lower flanges of said beams. The angle-irons are also notched at their ends in the same manner and extend between two parallel beams, but in this construction the number of said angle-irons is vastly decreased, owing to the fact that said beams support said tiles to a large extent, so that very much additional support is unnecessary.

In Fig. 22 I have shown my method of providing a large air-space between two light and independent partitions on walls without the usual danger of falling in. This consists in building said walls or partitions the required distance apart and at regular intervals laying Z-irons 19 between the same, the ends of which lie upon the tiles and are covered by the next tile laid thereon. The mortar introduced between said tiles holds said irons rigid and thus binds said two partitions to form a light, strong, and durable wall with a perfect air-space therein of any desired width.

In Fig. 23 I have illustrated my construction as applied to a roof. This coincides with the construction of the floor, except that another layer of tiles is laid over the first layer after all the joints in the same have been made water-tight, and the joints in said second layer are then also made water-tight. Obviously said second layer of tiles should be so laid as to cover all joints in said first layer with the solid tiles.

In all outside constructions and in places where the tiles are exposed to dampness I employ impregnated tiles, which are both waterproof and fireproof and much stronger than those ordinarily used.

I claim as my invention—

1. In a fireproof construction, the combination with a series of parallel angle-irons, of interlocking tiles having one end conforming in general shape with the outer projecting angular face of an angle-iron and adapted to enter the recessed portion of the same, and the opposite end angularly recessed in general accordance with the outer projecting angular face of an angle-iron and adapted to receive the same or the projecting end of the next succeeding tile, whereby said tiles interlock with said angle-irons and with each other.

2. In a fireproof construction, the combination with a series of parallel angle-irons, of interlocking hollow tiles having parallel front and rear ends respectively projecting and recessed at angles greater than the angles of said angle-irons and adapted to interlock therewith.

3. In a fireproof construction, the combination with a series of angle-irons, of hollow tiles having front and rear ends adapted to interlock with each other and with the angular faces of said angle-irons, said tiles being of greater thickness than the greatest width of said angle-irons to enable said angle-irons to be completely embedded between said tiles.

4. In a fireproof construction, the combination with a series of angle-irons having the angular faces respectively parallel, of tiles having parallel front and rear angular faces adapted respectively to enter the recessed portions of said angle-irons and to receive the outer angular faces thereof, said front faces of said tiles being adapted to enter the recessed rear faces of the next preceding tiles and to interlock therewith.

5. In a fireproof construction, a floor comprising a series of angle-irons having their angular faces respectively parallel, of tiles having front and rear faces respectively conforming in shape with and adapted to interfit with the angular faces of said angle-irons, said tiles and angle-irons being so arranged that said angle-irons are supported by said tiles and serve as a means of transferring the strain from an unsupported tile to the tiles supported upon the beams or joists and thus to said joists.

6. In a fireproof construction, a floor comprising a series of parallel angle-irons adapted to interlock with tiles having edges adapted to engage said angle-irons and to interlock with each other, said angle-irons being supported by said tiles.

7. In a fireproof construction, a ceiling comprising a plurality of angle-irons secured to the beams by suitable hangers and adapted to support tiles between the same, said tiles being provided with projecting edges adapted to enter the angular recesses in said angle-irons, and with recesses adapted to receive the projecting corner formed by the meeting edges of the flanges of said angle-irons.

8. In a fireproof construction, a partition comprising a series of parallel upright angle-irons split at their lower ends at the meeting edges of their flanges and having said ends bent outwardly to form a base to support said angle-irons, and held at their upper ends in socket-pieces provided with recesses conforming in shape with and adapted to receive said angle-irons, and tiles having angular ends adapted to interlock with said angle-irons and with each other.

9. In a fireproof construction, a hollow wall comprising two parallel walls consisting of angle-irons and tiles adapted to interlock therewith, and Z-irons interposed between said parallel walls and rigidly secured at the ends thereto to bind said parallel walls.

10. In a fireproof construction, the combination with a series of angle-irons, of tiles adapted to interlock therewith, said tiles having projecting and recessed front and rear ends respectively projecting and recessed at angles greater than the angles of said angle-irons, said tiles being also of greater thickness than the greatest width of said angle-irons to enable said angle-irons to be embedded between said tiles.

11. In a fireproof construction, the combination with a series of irons having their two opposite faces respectively recessed and projecting, of tiles having one face conforming in general shape with the shape of said irons and adapted to enter the recessed portion thereof, and having their opposite faces recessed in general conformity with the shape of said irons and adapted to receive the projecting faces of said irons or the projecting ends of the next succeeding tiles, whereby said tiles will interlock with each other and with said irons.

12. In a fireproof construction, the combination with a series of irons having their two opposite faces respectively projecting and recessed, of tiles having two opposite faces conforming in general shape respectively with the respective faces of said irons, said projecting ends of said tiles being so formed as to fit only partially into the recessed faces of said irons, and said recessed ends of said tiles being so formed as to receive said projecting faces of said irons, so as to leave a space between the outer portion of the projecting faces of said irons and the outer portions of recess in said tile to receive a cement.

In testimony whereof I affix my signature in presence of two witnesses.

FRIEDRICH D. T. LEHMANN.

Witnesses:
RUDOLPH WM. LOTZ,
O. T. ZINKEISEN.